United States Patent [19]
Herrmann et al.

[11] Patent Number: 6,080,902
[45] Date of Patent: Jun. 27, 2000

[54] METHOD OF USING POLYOLEFIN WAXES

[75] Inventors: Hans-Friedrich Herrmann, Gross-Gerau; Gerd Hohner, Gersthofen, both of Germany

[73] Assignee: Clariant GmbH, Frankfurt, Germany

[21] Appl. No.: 09/113,384

[22] Filed: Jul. 10, 1998

[30] Foreign Application Priority Data

Jul. 11, 1997 [DE] Germany ............... 197 29 836
Mar. 13, 1998 [DE] Germany ............... 198 10 891

[51] Int. Cl.$^7$ ...................................... C07C 2/24
[52] U.S. Cl. .................. 585/512; 585/9; 585/10; 585/12; 585/511
[58] Field of Search .................. 585/9, 10, 12, 585/511, 512

[56] References Cited

U.S. PATENT DOCUMENTS

| | | |
|---|---|---|
| 3,578,649 | 5/1971 | Badguerahanian et al. . |
| 3,951,935 | 4/1976 | Engelmann . |
| 4,039,560 | 8/1977 | Tomoshige . |
| 5,023,388 | 6/1991 | Lüker . |
| 5,723,705 | 3/1998 | Herrmann et al. . |
| 5,750,813 | 5/1998 | Hess et al. . |

FOREIGN PATENT DOCUMENTS

| | | |
|---|---|---|
| 0321851 | 6/1989 | European Pat. Off. . |
| 571882 | 12/1993 | European Pat. Off. . |
| 584586 | 3/1994 | European Pat. Off. . |
| 602509 | 6/1994 | European Pat. Off. . |
| 1520609 | 8/1969 | Germany . |

OTHER PUBLICATIONS

Ullmann's Encyclopedia of Ind. Chem. 5.ed., vol. A28, pp. 103ff.
European Search Report.
Derwent Publications Ltd., London, GB: AN 265520 XP002081066 "electric insulate composition coating" A—Zusammenfassung—& JP 0811121 A (Hitachi Cable) Apr. 30, 1996.

*Primary Examiner*—Helen L. Pezzuto
*Attorney, Agent, or Firm*—Susan S. Jackson; Scott E. Hanf

[57] ABSTRACT

The present invention relates to a method of using polyolefin waxes prepared by means of metallocene catalysts as additive components in printing inks and surface coatings.

3 Claims, No Drawings

METHOD OF USING POLYOLEFIN WAXES

The present invention relates to the use of polyolefin waxes, in particular of ethylene and propylene homopolymer and copolymer waxes, prepared using metallocene catalysts.

BACKGROUND OF THE INVENTION

Polyolefin waxes are important for many application areas. Their use as additives in printing inks and surface coatings is attracting increasing interest. In printing inks, waxes increase the wear, abrasion and scratch resistance of printed products. In surface coatings, waxes serve not only to improve the mechanical properties of the coating surface but also to achieve matting effects (cf. Ullmann's Encyclopedia of Industrial Chemistry, Weinheim, Basel, Cambridge, New York, 5.ed., Vol. A 28, p. 103 ff). For the printing ink and surface coatings applications, the waxes are used in the form of solvent dispersions or pastes or else in solid micronized form. Micronization is carried out either by milling in suitable mills or by spraying from the melt, in each case with subsequent classification if necessary. The required average particle sizes are generally below 10 $\mu$m.

For these applications, use has hitherto been made of waxes from various preparation processes. A customary method is, apart from free-radical polymerization at high pressures and temperatures, the preparation of waxes in solution using Ziegler-Natta catalysts comprising a titanium compound as catalytically active species (cf. DE-A-1 520 914, U.S. Pat. No. 3,951,935, U.S. Pat. No. 4,039,560, EP-A-584 586).

The nonuniformity of the products can be seen from a broad distribution of the chain lengths, i.e. the polydispersity, from the nonuniformity of the incorporation of comonomers within a chain and the distribution of the comonomer content between various types of chains. This leads to products having reduced hardness and containing volatile or extractable components.

SUMMARY OF THE INVENTION

It is an object of the present invention to find improved polyolefin waxes as additives in surface coatings and printing inks.

This object is achieved by use of polyolefin waxes which are prepared by olefin polymerization using metallocene catalyst systems.

It has been found that, in particular, the use of metallocene catalyst systems in the preparation of polyolefin waxes leads to materials which give improved abrasion resistance or matting effects when used in printing inks and surface coatings.

Furthermore, it has been found that polyolefin waxes prepared using metallocenes are also, owing to the uniform structure within the polymer chain, advantageous compared to waxes likewise having a narrow distribution but prepared using Ziegler-Natta catalyst.

Possible processes for preparing the polyolefin waxes of the invention are described in EP-A-571 882 and EP-A-602 509. However, other processes such as solution, suspension, gas-phase or bulk processes which make it possible to use metallocene or other single-center catalyst systems based on titanium, nickel, palladium or vanadium compounds are also suitable in principle.

The object of the invention is achieved by polyolefins and polyolefin waxes which are prepared by means of metallocene catalysts and are used for producing printing inks, surface coatings, melt adhesives and photocopier toners.

DESCRIPTION OF THE PREFERRED EMBODIMENTS

Preference is given to polyolefin waxes prepared using sandwich chelate compounds, in particular those prepared using metallocene compounds, wherein the metallocene is a compound of the formula I:

(1)

This formula also encompasses compounds of the formula Ia

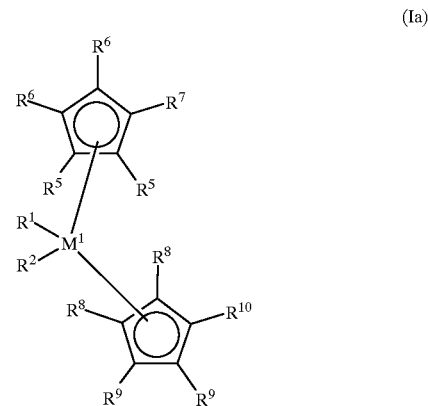

(Ia)

the formula Ib

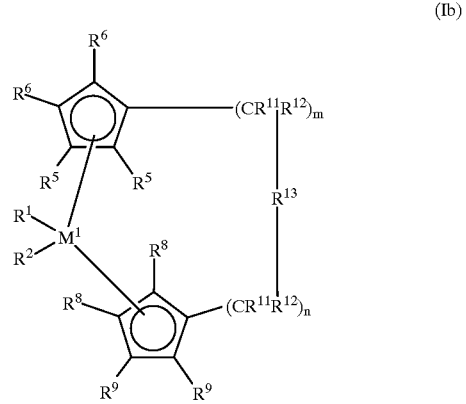

(Ib)

and the formula Ic

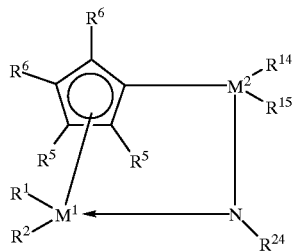
(Ic)

In the formulae I, Ia, Ib and Ic, $M^1$ is a metal of group IVb, Vb or VIb of the Periodic Table, for example titanium, zirconium, hafnium, vanadium, niobium, tantalum, chromium, molybdenum, tungsten, preferably titanium, zirconium or hafnium.

$R^1$ and $R^2$ are identical or different and are each a hydrogen atom, a $C_1$–$C_{10}$—, preferably $C_1$–$C_3$-alkyl group, a $C_1$–$C_{10}$—, preferably $C_1$–$C_3$-alkoxy group, a $C_6$–$C_{10}$—, preferably $C_6$–$C_8$-aryl group, a $C_6$–$C_{10}$—, preferably $C_6$–$C_8$-aryloxy group, a $C_2$–$C_{10}$—, preferably $C_2$–$C_4$-alkenyl group, a $C_7$–$C_{40}$—, preferably $C_7$–$C_{10}$-arylalkyl group, a $C_7$–$C_{40}$—, preferably $C_7$–$C_{12}$-alkylaryl group, a $C_8$–$C_{40}$—, preferably $C_8$–$C_{12}$-arylalkenyl group or a halogen atom, preferably chlorine or methyl.

$R^3$ and $R^4$ are identical or different and are each a monocyclic or polycyclic hydrocarbon radical which can form a sandwich structure with the central atom $M^1$. $R^3$ and $R^4$ are preferably cyclopentadienyl, indenyl, benzindenyl or fluorenyl, where the base structures can also bear additional substituents or be bridged to one another. Furthermore, one of the radicals $R^3$ and $R^4$ can be a substituted nitrogen atom, where $R^{24}$ is as defined for $R^{17}$ and is preferably methyl, t-butyl or cyclohexyl.

$R^5$, $R^6$, $R^7$, $R^8$, $R^9$ and $R^{10}$ are identical or different and are each a hydrogen atom, a halogen atom, preferably a fluorine, chlorine or bromine atom, a $C_1$–$C_{10}$—, preferably $C_1$–$C_4$-alkyl group, a $C_6$–$C_{10}$—, preferably $C_6$–$C_8$-aryl group, a $C_1$–$C_{10}$—, preferably $C_1$–$C_3$-alkoxy group, a —$NR^{16}_2$—, —$SR^{16}$—, —$OSiR^{16}_3$—, —$SiR^{16}_3$— or —$PR^{16}_2$ radical, where $R^{16}$ is a $C_1$–$C_{10}$—, preferably $C_1$–$C_3$-alkyl group or $C_6$–$C_{10}$—, preferably $C_6$–$C_8$-aryl group or, in the case of Si— or P— containing radicals, a halogen atom, preferably a chlorine atom, or two adjacent radicals $R^5$, $R^6$, $R^7$, $R^8$, $R^9$ or $R^{10}$ together with the carbon atoms connecting them form a ring. Particularly preferred ligands are the substituted compounds of the base structures indenyl, benzindenyl, fluorenyl and cyclopentadienyl.

$R^{13}$ is

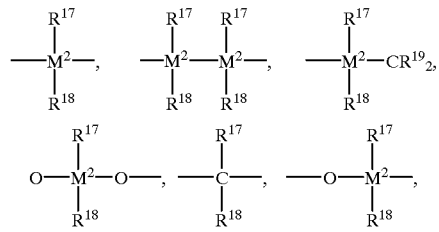

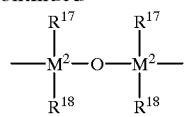

$=BR^{17}$, $=AIR^{17}$, —Ge—, —Sn—, —O—, —S—, =SO, $=SO_2$, $=NR^{15}$, =CO, $=PR^{15}$ or $=P(O)R^{15}$ where $R^{17}$, $R^{18}$ and $R^{19}$ are identical or different and are each a hydrogen atom, a halogen atom, a $C_1$–$C_{30}$—, preferably $C_1$–$C_4$-alkyl group, in particular a methyl group, a $C_1$–$C_{10}$-fluoroalkyl group, preferably a $CF_3$ group, a $C_6$–$C_{10}$-fluoroaryl group, preferably a pentafluorophenyl group, a $C_6$–$C_{10}$—, preferably $C_6$–$C_8$-aryl group, a $C_1$–$C_{10}$—, preferably $C_1$–$C_4$-alkoxy group, in particular a methoxy group, a $C_2$–$C_{10}$—, preferably $C_2$–$C_4$-alkenyl group, a $C_7$–$C_{40}$—, preferably $C_7$–$C_{10}$-arylalkyl group, a $C_8$–$C_{40}$—, preferably $C_8$-$C_{12}$-arylalkenyl group or a $C_7$–$C_{40}$—, preferably $C_7$–$C_{12}$-alkylaryl group, or $R^{17}$ and $R^{18}$ or $R^{17}$ and $R^{19}$ in each case together with the atoms connecting them form a ring.

$M^2$ is silicon, germanium or tin, preferably silicon or germanium.

$R^{13}$ is preferably $=CR^{17}R^{18}$, $=SiR^{17}R^{18}$, $=GeR^{17}R^{18}$, —O—, —S—, =SO, $=PR^{17}$ or $=P(O)R^{17}$.

$R^{11}$ and $R^{12}$ are identical or different and are as defined for $R^{17}$. m and n are identical or different and are zero, 1 or 2, preferably zero or 1, where m plus n is zero, 1 or 2, preferably zero or 1.

$R^{14}$ and $R^{15}$ are as defined for $R^{17}$ and $R^{18}$.

Examples of suitable metallocenes are:
bis(1,2,3-trimethylcyclopentadienyl)zirconium dichloride,
bis(1,2,4-trimethylcyclopentadienyl)zirconium dichloride,
bis(1,2-dimethylcyclopentadienyl)zirconium dichloride,
bis(1,3-dimethylcyclopentadienyl)zirconium dichloride,
bis(1-methylindenyl)zirconium dichloride,
bis(1-n-butyl-3-methyl-cyclopentadienyl)zirconium dichloride,
bis(2-methyl-4,6-di-i-propylindenyl)zirconium dichloride,
bis(2-methylindenyl)zirconium dichloride,
bis(4-methylindenyl)zirconium dichloride,
bis(5-methylindenyl)zirconium dichloride,
bis(alkylcyclopentadienyl)zirconium dichloride,
bis(alkylindenyl)zirconium dichloride,
bis(cyclopentadienyl)zirconium dichloride,
bis(indenyl)zirconium dichloride,
bis(methylcyclopentadienyl)zirconium dichloride,
bis(n-butylcyclopentadienyl)zirconium dichloride,
bis(octadecylcyclopentadienyl)zirconium dichloride,
bis(pentamethylcyclopentadienyl)zirconium dichloride,
bis(trimethylsilylcyclopentadienyl)zirconium dichloride,
biscyclopentadienyidibenzylzirconium,
biscyclopentadienyidimethylzirconium,
bistetrahydroindenylzirconium dichloride,
dimethylsilyl-9-fluorenylcyclopentadienylzirconium dichloride,
dimethylsilylbis-1-(2,3,5-trimethylcyclopentadienyl) zirconium dichloride,
dimethylsilylbis-1-(2,4-dimethyl-cyclopentadienyl) zirconium dichloride,
dimethylsilylbis-1-(2-methyl-4,5-benzindenyl)zirconium dichloride,
dimethylsilylbis-1-(2-methyl-4-ethylindenyl)zirconium dichloride,
dimethylsilylbis-1-(2-methyl-4-i-propylindenyl)zirconium dichloride,
dimethylsilylbis-1-(2-methyl-4-phenylindenyl)zirconium dichloride, dimethylsilylbis-1-(2-methylindenyl)zirconium dichloride,
dimethylsilylbis-1-(2-methyltetrahydroindenyl)zirconium dichloride,
dimethylsilylbis-1-indenylzirconium dichloride,
dimethylsilylbis-1-indenyldimethylzirconium,
dimethylsilylbis-1-tetrahydroindenylzirconium dichloride,
diphenylmethylene-9-fluorenylcyclopentadienylzirconium dichloride,
diphenylsilylbis-1-indenylzirconium dichloride,
ethylenebis-1-(2-methyl-4,5-benzoindenyl)zirconium dichloride,
ethylenebis-1-(2-methyl-4-phenylindenyl)zirconium dichloride,
ethylenebis-1-(2-methyltetrahydroindenyl)zirconium dichloride,
ethylenebis-1-(4,7-dimethylindenyl)zirconium dichloride,
ethylenebis-1-indenylzirconium dichloride,
ethylenebis-1-tetrahydroindenylzirconium dichloride,
indenylcyclopentadienylzirconium dichloride
isopropylidene(1-indenyl)(cyclopentadienyl)zirconium dichloride,
isopropylidene(9-fluorenyl)(cyclopentadienyl)zirconium dichloride,
phenylmethylsilylbis-1-(2-methylindenyl)zirconium dichloride,
and also the alkyl or aryl derivatives of each of these metallocene dichlorides.

To activate the single-center catalyst systems, suitable cocatalysts are used. Suitable cocatalysts for metallocenes of the formula I are organoaluminum compounds, in particular aluminoxanes, or aluminum-free systems such as $R^{22}{}_xNH_{4-x}BR^{23}{}_4$, $R^{22}{}_xPH_{4-x}BR^{23}{}_4$, $R^{22}{}_3CBR^{23}{}_4$ or $BR^{23}{}_3$. In these formulae, x is from 1 to 4, the radicals $R^{22}$ are identical or different, preferably identical, and are $C_1$–$C_{10}$-alkyl or $C_6$–$C_{18}$-aryl or two radicals $R^{22}$ together with the atom connecting them form a ring, and the radicals $R^{23}$ are identical or different, preferably identical, and are $C_6$–$C_{18}$-aryl which may be substituted by alkyl, haloalkyl or fluorine. In particular, $R^{22}$ is ethyl, propyl, butyl or phenyl and $R^{23}$ is phenyl, pentafluorophenyl, 3,5-bis(trifluoromethyl)-phenyl, mesityl, xylyl or tolyl.

These cocatalysts are particularly suitable in combination with metallocenes of the formula I, when $R^1$ and $R^2$ are each a $C_1$–$C_{10}$-alkyl group or an aryl or benzyl group, preferably a methyl group. Derivative formation to give the metallocenes of the formula I can be carried out by methods known from the literature, for example by reaction with alkylating agents such as methyllithium (cf. Organometallics 9 (1990) 1539; J. Am. Chem. Soc. 95 (1973) 6263).

In addition, a third component is frequently necessary to provide protection against polar catalyst poisons. Organoaluminum compounds such as triethylaluminum, tributylaluminum and others, as well as mixtures, are suitable for this purpose.

Depending on the process, supported single-center catalysts can also be used. Preference is given to catalyst systems in which the residual contents of support material and cocatalyst in the product do not exceed a concentration of 100 ppm.

To prepare the polyolefin waxes of the invention, homopolymerizations, copolymerizations or terpolymerizations of olefins or diolefins having from 2 to 18 carbon atoms are carried out. Examples of olefins which can be used are ethylene, propylene, 1-butene, 1-pentene, 1-hexene, 1-octene, 2-methyl-1-propene, 3-methyl-1-butene, 3-methyl-1-pentene, 4-methyl-1-pentene, 4-methyl-1-hexene, styrene or cyclic olefins such as cyclopentene, cyclohexene, norbornene, 1,4,5,8-dimethano-1,2,3,4,4a,5,8,8a-octahydronaphthalene and their structural derivatives and also diolefins such as 1,5-hexadiene, 1,7-octadiene, 1,3- or 1,5-cyclooctadiene. Preference is given to polymerizing ethylene or propylene and also to copolymerizing ethylene or propylene with an olefin having from 2 to 10 carbon atoms. Examples of copolymer waxes are ethylene-propylene, ethylene-1-butene, ethylene-1-hexene, ethylene-norbornene and propylene-ethylene, propylene-1-butene waxes.

Examples of terpolymers are ethylene-propylene-1-butene or ethylene-propylene-1,5-hexadiene terpolymer waxes.

Copolymer waxes contain from 0 to 20% by weight of the comonomer, based on the total polymer. Terpolymer waxes comprise at least 80% by weight of the main monomer, while the two comonomers are each present in an amount of up to 19% by weight but the sum of the amounts of the two comonomers does not exceed 20% by weight of the total monomer.

The polyolefin waxes described below are particularly suitable for the applications mentioned:

Polyethylene waxes prepared using metallocene compounds and having a narrow molecular weight distribution $M_w/M_n<5$, preferably <3, a melt viscosity of from 5 to 100000 mPas measured at 140° C. and a melting point of from 137° to 70° C.

Polypropylene waxes prepared using metallocene compounds and having a narrow molecular weight distribution $M_w/M_n<5$, preferably <3, a melt viscosity of from 5 to 100000 mPas measured at 170° C. and a melting point of from 165° to 70° C.

Definitions:

$M_w$=weight average molar mass in g/mol determined by GPC $M_n$=number average molar mass in g/mol determined by GPC $M_w/M_n$=polydispersity GPC=gel permeation chromatography

EXAMPLE 1

To prepare the catalyst, 18 mg of bis(cyclopentadienyl) zirconium dichloride are dissolved in 10 cm³ of 10% strength by weight methylaluminoxane solution in toluene and are preactivated by allowing to stand for 15 minutes. In parallel to this, a dry 16 dm³-vessel which has been flushed with nitrogen is charged with 4 kg of propane and, at 30° C., 1.0 bar of hydrogen and 4.5 bar of ethylene are metered in. The reactor is heated to 70° C. and stirred at 100 rpm. After 20 minutes, the polymerization is started at 250 rpm by addition of the catalyst via the pressure lock. The polymerization temperature is regulated at 70° C. by cooling and the composition in the gas space is kept constant by metering in more of the components. After a polymerization time of 1 hour, the reaction is stopped by addition of isopropanol and the reactor is vented and opened. Vacuum drying of the product gives 1.9 kg of polyethylene wax having a VN (viscosity number) of 16 cm³/g. DSC (Differential Scanning Calorimetry) indicates a melting point of 123° C. and a melting enthalpy of 254 [J/g]. Further property data are shown in Table 1.

EXAMPLE 2

To prepare the catalyst, 8 mg of rac-ethylene-bis-tetrahydroindenylzirconium dichloride in 5 cm³ of 10% strength by weight methylaluminoxane solution in toluene are used. The reactor from Example 1 is charged with 1 kg of propane and 2.5 kg of propene and, at 30° C., 1.2 bar of hydrogen are metered in. Polymerization is carried out as in Example 1. Vacuum drying of the product gives 1.60 kg of polypropylene wax having a VN of 6.7 cm³/g. DSC indicates a melting point of 124° C. and a enthalpy of fusion of 92 [J/g]. Further property data are shown in Table 1.

EXAMPLE 3

To prepare the catalyst, 27 mg of bis-n-butylcyclopentadienylzirconium dichloride in 5 cm³ of 10% strength by weight methylaluminoxane solution in toluene are used. The reactor from Example 1 is charged with 3 kg of propane and 0.7 kg of propene and, at 30° C., 0.5 bar of hydrogen and 7 bar of ethylene are metered in. Polymerization is carried out as in Example 1. Vacuum drying of the product gives 1.5 kg of ethylene-propylene copolymer wax having a VN of 19 cm³/g. DSC indicates a melting point of 106° C. and an enthalpy of fusion of 123 [J/g]. Further property data are shown in Table 1.

EXAMPLE 4

To prepare the catalyst, 1.5 mg of rac-dimethylsilylbis(2-methyl-4,5-benzindenyl)zirconium dichloride in 5 cm³ of 10% strength by weight methylaluminoxane solution in toluene are used. The reactor from Example 1 is charged with 1 kg of propane and 3 kg of propene and at 30° C., 1.6 bar of hydrogen and 1.6 bar of ethylene are metered in. Polymerization is carried out as in Example 1. Vacuum drying of the product gives 1.90 kg of propylene-ethylene copolymer wax having a VN of 31 cm³/g. DSC indicates a melting point of 118° C. and an enthalpy of fusion of 82 [J/g]. Further property data are shown in Table 1.

The waxes prepared as described in Examples 1–4 were tested in printing ink and surface coating formulations in comparison with commercial waxes synthesized by the Ziegler-Natta process.

TABLE 1

Physical properties of the waxes tested:

| | Type | Melt viscosity mPa · s | Drop point ° C. | Mw/Mn | Mn g/mol | Density g/cm³ |
|---|---|---|---|---|---|---|
| Test sample 1, from Ex. 1 | Metallocene ethylene-homopolymer wax, | 350 at 140° C. | 124 | 2.4 | 990 | 0.965 |
| Test sample 2, from Ex. 2 | Metallocene propene-homopolymer wax, | 40 at 170° C. | 135 | 2.1 | 1870 | 0.880 |
| Test sample 3, from Ex. 3 | Metallocene ethylene-propene-copolymer wax, | 640 at 140° C. | 107 | 2.5 | 2220 | 0.928 |
| Test sample 4, from Ex. 4 | Metallocene propene-ethylene-copolymer wax, | 1490 at 170° C. | 127 | 2.4 | 7071 | 0.871 |
| Comparative sample 1 | Ethylene homopolymer wax prepared using Ziegler-Natta-catalysator. | 300 at 140° C. | 125 | 2.8 | 1500 | 0.970 |
| Comparative sample 2 | Ethylene-propene-copolymer- wax prepared using Ziegler-Natta catalyst. | 630 at 140° C. | 119 | 2.8 | 2500 | 0.930 |

EXAMPLES 5, 6 AND COMPARATIVE EXAMPLE 1

The test samples 1 and 2 and also comparative sample 1 were each micronized by comminution in an air jet mill (Chrispro-Jetmill MC 100, Micro-Macinazione SA). The micropowders were incorporated in an amount of 1.5% by weight into an offset ink (Novaboard cyan 4 C 86, K+E Druckfarben) by means of intensive stirring using a dissolver. A test print was produced (Prüfbau multipurpose test printing machine, system Dr. Dürner) on Phoenomatt 115 g/m2 paper (Scheufelen GmbH+Co KG) and the abrasion behavior was examined on an abrasion testing apparatus (abrasion tester, Prüfbau Quartant) at a loading of 48 g/cm2, speed 15 cm/sec. The intensity of the color transferred to the test sheet was assessed (color difference in accordance with DIN 6174, measured using Hunterlab D 25-2, Hunter).

TABLE 2

Result of testing in an offset ink when incorporated as micropowder

| | | | Color difference | |
|---|---|---|---|---|
| | | Particle size $d_{50}$ [μm] | 100 strokes | 200 strokes |
| | Comparison without wax | — | 14.4 | 15.9 |
| Example 5 | Test sample 1 | 5.6 | 1.5 | 1.8 |
| Example 6 | Test sample 2 | 6.3 | 1.1 | 1.9 |

TABLE 2-continued

Result of testing in an offset ink when incorporated as micropowder

|  |  | Particle size $d_{50}$ [μm] | Color difference | |
|---|---|---|---|---|
|  |  |  | 100 strokes | 200 strokes |
| Comparative Example 1 | Comparative sample 1 | 8.3 | 2.2 | 2.7 |

The waxes of the invention give a finer powder and result in a lower color difference and thus have improved abrasion resistance.

EXAMPLE 7 AND COMPARATIVE EXAMPLE 2

10 parts of test sample 2 and comparative sample 1 were each heated to 100° C. in 30 parts of toluene while stirring. The clear solution formed was cooled to a temperature which was 30° above the cloud point and stirred into 60 parts of cold toluene. The mixture was allowed to cool to room temperature while continuing to stir. The resulting dispersion was incorporated in an amount of 1.0% by weight into an illustration gravure ink (type RR Grav rot, Siegwerk Farbenfabrik Keller, Dr. Rung+Co). A test print was produced (gravure test printing apparatus LTG 20, Einlehner Prüfmaschinenbau) on paper of the type Allgäu 60 g/m² (G.Haindl'sche Papierfabriken KG) and tested as described in Example 5.

TABLE 3

Result of testing in a gravure ink, incorporated as dispersion

|  |  | Color difference after 20 strokes | | Color difference after 100 strokes | |
|---|---|---|---|---|---|
|  |  | Fulltone | Halftone | Fulltone | Halftone |
|  | Comparison without wax | 7 | 6.5 | 12.9 | 13.6 |
| Example 7 | Test sample 2 | 2.3 | 1.2 | 4.0 | 2.9 |
| Comparative Example 2 | Comparative sample 1 | 3.0 | 2.0 | 4.4 | 3.5 |

The waxes of the invention result in a lower color difference and thus have improved abrasion resistance.

EXAMPLE 8 AND COMPARATIVE EXAMPLE 3

33 parts of test sample 3 and comparative sample 2 were each dissolved in 67 parts of mineral oil PKWF 6/9 (Haltermann N.V.) at 135° C. while stirring. The solution was processed on a three-roll mill to give a paste. The paste was incorporated in an amount of 1.5% by weight into an offset ink (Novaboard Cyan 4 C 86 wax-free; K+E Druckfarben GmbH+CO KG) and tested as described in Example 5.

TABLE 4

Result of testing in an offset ink, incorporated as paste

|  |  | Color difference | |
|---|---|---|---|
|  |  | after 100 strokes | after 200 strokes |
|  | Comparison without wax | 10.8 | 16.8 |
| Example 8 | Test sample 3 | 2.6 | 3.5 |
| Comparative Example 3 | Comparative sample 2 | 3.5 | 4.7 |

EXAMPLE 9 AND COMPARATIVE EXAMPLE 4

Test sample 1 and comparative sample 1 were each tested using a method similar to Example 7.

TABLE 5

Result of testing in a gravure ink, incorporated as dispersion

|  |  | Color difference after 20 strokes | |
|---|---|---|---|
|  |  | Fulltone | Halftone |
|  | Comparison without wax | 7 | 6.5 |
| Example 9 | Test sample 3 | 1.3 | 0.9 |
| Comparative Example 4 | Comparative sample 2 | 1.4 | 1.3 |

EXAMPLE 10 AND COMPARATIVE EXAMPLE 5

Test sample 4 and comparative sample 2 were each tested using a method similar to Example 7.

TABLE 6

Result of testing in a gravure ink, incorporated as dispersion

|  |  | Color difference after 20 strokes | |
|---|---|---|---|
|  |  | Fulltone | Halftone |
|  | Comparison without wax | 7 | 6.5 |
| Example 10 | Test sample 4 | 1.1 | 0.8 |
| Comparative Example 5 | Comparative sample 2 | 1.4 | 1.3 |

EXAMPLES 11, 12 AND COMPARATIVE EXAMPLE 6

The micronized waxes described in Examples 5 and 6 were stirred into a standard nitrocellulose coating composition using a dissolver. The wax-containing surface coating composition was applied to a glass plate by means of a doctor blade (60 μm wet film thickness). The degree of gloss (matting effect) was assessed by means of a gloss measuring apparatus of the type micro-TRI-gloss (BYK-Gardner) after drying for 24 hours.

TABLE 7

Testing of ethylene and propene homopolymer waxes in a surface coating formulation when incorporated as micropowders

|  |  | Gloss (angle 60°) | |
|---|---|---|---|
|  |  | Wax concentration 2% by weight | Wax concentration 4% by weight |
|  | Comparison without wax | 140 | 140 |
| Example 11 | Test sample 1 | 25 | 13 |
| Example 12 | Test sample 2 | 30 | 15 |
| Comparative Example 6 | Comparative sample 1 | 32 | 17 |

The waxes of the invention display reduced surface gloss and an improved matting action.

EXAMPLES 13, 14 AND COMPARATIVE EXAMPLE 7

10 parts of wax were heated in 30 parts of xylene while stirring. The clear solution formed was cooled to a temperature which was 3° above the cloud point and stirred into 60 parts of cold xylene using a dissolver. The mixture was allowed to cool to room temperature while continuing to stir intensively. 20 or 40 parts of the 10% 25 strength wax dispersion were stirred into 80 to 60 parts respectively of a standard nitrocellulose coating composition. The wax-containing surface coating composition was tested as described in Example 11.

TABLE 8

Result of testing of copolymer waxes in a surface coating formuation when incorporated as dispersion

|  |  | Gloss (angle 60°) | |
|---|---|---|---|
|  |  | Wax concentration 2% by weight | Wax concentration 4% by weight |
|  | Comparison without wax | 143 | 143 |
| Example 13 | Test sample 3 | 15 | 4 |
| Example 14 | Test sample 4 | 16 | 7 |
| Comparative Example 7 | Comparative sample 2 | 18 | 9 |

EXAMPLES 15, 16 AND COMPARATIVE EXAMPLE 8

2 or 4 parts of the test wax were dissolved in 18 or 16 parts respectively of hot xylene to give a clear solution. The solution was cooled to a temperature which was 3° above the cloud point of the wax and stirred into 80 parts of standard nitrocellulose coating composition. The mixture was allowed to cool to room temperature while stirring intensively. The surface coating composition was applied to a glass plate using a method similar to Example 11 and the degree of gloss was measured.

TABLE 9

Result of incorporation by hot precipitation

|  |  | Gloss (angle 60°) | |
|---|---|---|---|
|  |  | Wax concentration 2% by weight | Wax concentration 4% by weight |
|  | Comparison without wax | 138 | 138 |
| Example 15 | Test sample 3 | 17 | 8 |
| Example 16 | Test sample 4 | 16 | 9 |
| Comparative Example 8 | Comparative sample 2 | 26 | 11 |

What is claimed is:

1. A method of using a polyolefin wax prepared by means of metallocene catalysts as an additive component for producing printing inks and surface coatings comprising incorporating the wax into a printing ink or a surface coating, wherein the wax is in a micronized form with a particle diameter of less than 10 μm.

2. The method of using as claimed in claim 1, wherein the polyolefin wax is an ethylene homopolymer or copolymer wax having a molecular weight distribution $M_w/M_n<5$, a melt viscosity of from 5 to 100000 mPas measured at 140° C. and a melting point of from 137° to 70° C.

3. The method of using as claimed in claim 1, wherein the polyolefin wax is a propylene homopolymer or copolymer wax having a molecular weight distribution $M_w/M_n<5$, a melt viscosity of from 5 to 100000 mPas measured at 170° C. and a melting point of from 165° to 70° C.

* * * * *